(12) United States Patent
Whitaker et al.

(10) Patent No.: US 8,505,888 B2
(45) Date of Patent: Aug. 13, 2013

(54) TUBULAR TORSION BAR

(75) Inventors: Todd Michael Whitaker, Boulder, CO (US); Adam Cuthbert Pauluhn, Niwot, CO (US)

(73) Assignee: Impulse Composites, LLC, Niwot, CO (US)

( * ) Notice: Subject to any disclaimer, the term of this patent is extended or adjusted under 35 U.S.C. 154(b) by 106 days.

(21) Appl. No.: 12/955,039

(22) Filed: Nov. 29, 2010

(65) Prior Publication Data

US 2011/0127705 A1    Jun. 2, 2011

Related U.S. Application Data

(60) Provisional application No. 61/283,336, filed on Dec. 1, 2009.

(51) Int. Cl.
*B60G 11/18* (2006.01)
(52) U.S. Cl.
USPC .......................................... 267/273; 267/154
(58) Field of Classification Search
USPC ................. 267/273, 275, 276, 279–282, 148, 267/149, 154; 280/124.13
See application file for complete search history.

(56) References Cited

U.S. PATENT DOCUMENTS

| | | | | |
|---|---|---|---|---|
| 4,491,342 A | * | 1/1985 | Aubry | 280/124.13 |
| 4,659,069 A | * | 4/1987 | Odobasic | 267/280 |
| 5,020,783 A | | 6/1991 | Schroder et al. | |
| 7,905,441 B2 | * | 3/2011 | Scherzinger et al. | 242/374 |

\* cited by examiner

*Primary Examiner* — Melanie Torres Williams
(74) *Attorney, Agent, or Firm* — Parsons & Goltry; Robert A. Parsons; Michael W. Goltry

(57) ABSTRACT

A tubular torsion bar includes an elongated inner tube of flexible material having a proximal end and a distal end and an elongated outer tube of flexible material having a proximal end and a distal end. A joiner bushing fixedly attaches the distal end of the inner tube to the distal end of the outer tube with the inner tube and outer tube positioned in coaxial and substantially coextensive concentric nesting positions. Mounting apparatus is fixedly attached to the proximal end of the outer tube and a planetary gear system is coupled to the proximal ends of the inner tube and the mounting apparatus and designed to provide a selected torque versus deflection characteristic of the tubular torsion bar.

22 Claims, 6 Drawing Sheets

TUBULAR TORSION BAR

CROSS-REFERENCE TO RELATED APPLICATIONS

This application claims the benefit of U.S. Provisional Application No. 61/283,336, filed 1 Dec. 2009.

FIELD OF THE INVENTION

This invention generally relates to springs and more specifically to the torsion bar type springs.

BACKGROUND OF THE INVENTION

Many types of springs are available for energy storage. For example, coil springs store energy by compressing a helically wound wire. Other types of conventional springs include torsion springs and torsion bars. All spring systems can be characterized by how much energy can be stored per unit volume. Another property by which springs can be characterized is by how much energy can be stored per unit mass (or weight). The performance of devices which utilize springs for energy storage can be improved by increasing the amount of energy which can be stored per unit volume and per unit mass.

A somewhat different type of torsional spring is disclosed in U.S. Pat. No. 5,020,783, entitled "Torsional Spring", and issued Jun. 4, 1991. This patent discloses a torsional spring formed by providing an inner tube that is continuously turned back at a distal end to produce an outer coaxial tube. The tube is made of glass-fiber reinforced plastic. The free end of the inner portion of the tube is connected to one component of a device requiring some spring action and the free end of the outer portion of the tube is connected to a second component of the device. The two components of the device can then be rotated relative to each other and the tube provides some spring action. A major problem with this type of torsional spring is the difficulty in manufacturing it. A second drawback is the fact that the inner and outer portions of the tube must be a continuous formation of the same material. A further drawback is the fact that the relative rotation between the two components of the device is strictly limited to the amount of torsion or twisting that can be allowed between the inner and outer portions of the tube.

It would be highly advantageous, therefore, to remedy the foregoing and other deficiencies inherent in the prior art.

Accordingly, it is an object of the present invention to provide a new and improved tubular torsion bar.

It is another object of the present invention to provide a new and improved tubular torsion bar with improved energy storage potential per unit mass and volume.

It is another object of the present invention to provide a new and improved tubular torsion bar that is simpler to manufacture and use.

SUMMARY OF THE INVENTION

Briefly, to achieve the desired objects of the instant invention in accordance with a preferred embodiment thereof, provided is a tubular torsion bar including an elongated inner tube of flexible material having a proximal end and a distal end and an elongated outer tube of flexible material having a proximal end and a distal end. A joiner bushing fixedly attaches the distal end of the inner tube to the distal end of the outer tube with the inner tube and outer tube positioned in coaxial and substantially coextensive concentric nesting positions. Mounting apparatus is fixedly attached to the proximal end of the outer tube and output apparatus is fixedly attached to the proximal end of the inner tube. In a preferred embodiment the output apparatus includes a planetary gear system attached to the proximal ends of the inner tube and the mounting apparatus and designed to provide a selected torque versus deflection characteristic of the tubular torsion bar.

The desired objects of the instant invention are further achieved in accordance with a specific embodiment thereof wherein a tubular torsion bar includes an elongated inner tube of flexible material having a proximal end and a distal end and an elongated outer tube of flexible material having a proximal end and a distal end. A joiner bushing fixedly attaches the distal end of the inner tube to the distal end of the outer tube with the inner tube and outer tube positioned in coaxial and substantially coextensive concentric nesting positions. A housing is fixedly attached to the proximal end of the outer tube. A planetary gear system is positioned within the housing and includes a ring gear fixedly connected to an inner surface of the housing and coaxial with the outer tube, planet gears attached to the proximal end of the inner tube and in a meshing relationship with the ring gear, and a sun gear positioned coaxial with the inner tube and in a meshing relationship with the planet gears. An output shaft is affixed to and coaxial with the sun gear. The output shaft is mounted to extend outwardly from the housing and to be accessible externally from the housing. The planetary gear system is attached to apply a torque to the outer tube relative to the inner tube, and the planetary gear system is designed to provide a selected torque versus deflection characteristic of the tubular torsion bar.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE DRAWINGS

Figure 1:
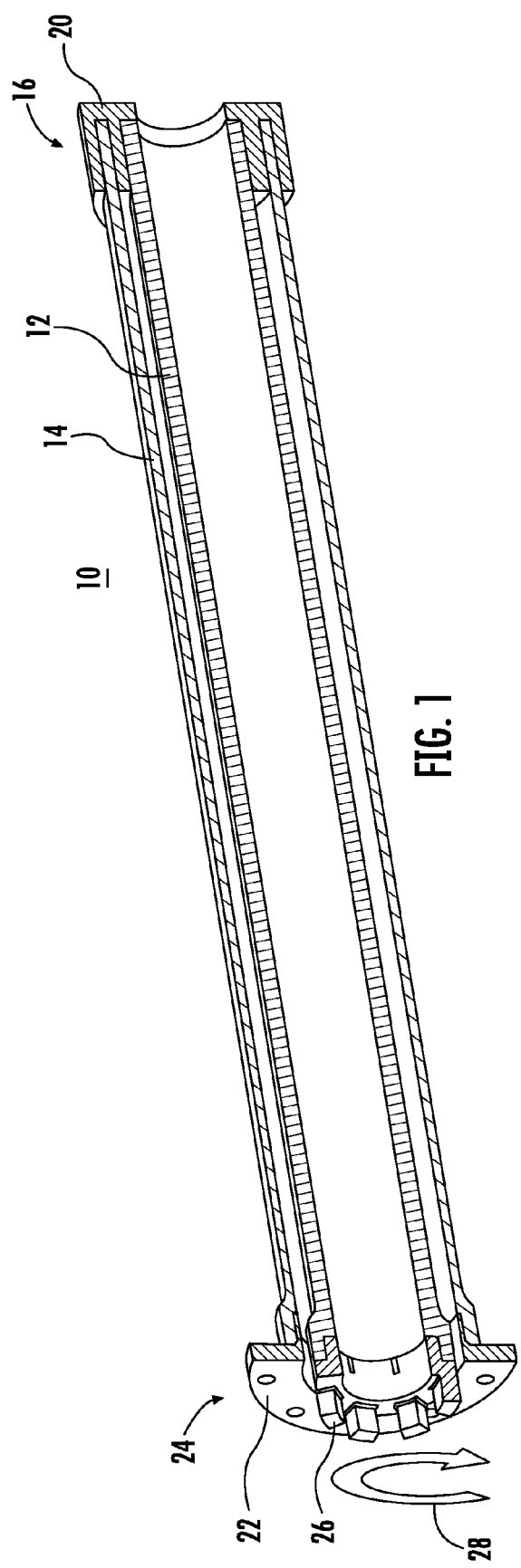
FIG. 1 is a cross-sectional view in perspective of a tubular torsion bar in accordance with the present invention.

Turning now to FIG. 1, a tubular torsion bar 10, in accordance with the present invention, is illustrated. Torsion bar 10 includes an inner tube 12 and an axially aligned outer tube 14 fixedly joined at a distal end 16 by a joiner bushing 20. Mounting apparatus, which in this example includes a mounting ferrule 22, is attached to a proximate end 24 of outer tube 14 for fixedly attaching tubular torsion bar 10 to a component of a device (not shown) requiring some spring action. Output apparatus, which in this example includes an output ferrule 26, is attached to the proximate end of inner tube 12 and is designed to be coupled to a second component of the device. Here it should be noted that the term "output apparatus" is used to denote apparatus that not only provides an output torque but that also is used to apply input toque to tubular torsion bar 10. Also, in some special applications the mounting and output apparatus could be reversed. Torsional or spring energy is stored in torsion bar 10 by rotating inner tube 12 relative to outer tube 14 that is by rotating output ferrule 26 as illustrated by arrow 28. Also, it will be understood that the torsional or spring energy stored in torsion bar 10 is applied to output ferrule 26.

Material selection for inner tube 12, outer tube 14 and joiner bushing 20 can be manipulated for different applications. In one example, outer tube 14 is made from metal while inner tube 12 is a fiber reinforced composite material. In other examples both inner and outer tubes 12 and 14 can be made from a composite material or from metal. One advantage to using composite materials over metals is that the composite materials are lower density than metals with comparable strength. Therefore, generally more energy can be stored in composite tubes per unit mass than in metals. Also, composite materials are less stiff than metals, which mean a higher angular deflection is possible for the composite tubes compared to metal tubes. However, there is a greater limit on the diameter of composite tubes that can be used. As the diameter of composite tubes is increased, the performance is limited by a critical torsional buckling load, whereas at small diameters torsional buckling is not a concern. As the composite tube diameter increases torsional buckling becomes more likely and the strength of the composite materials cannot be fully utilized. Therefore, depending on the diameter of the tubes and the energy storage requirements for any specific application, either metal or composite material can be used for either or both of inner tube 12 and outer tube 14.

It will be understood that in general the length of inner tube 12 and outer tube 14 depends upon the application. As the length of inner tube 12 and outer tube 14 increases, the amount of energy that can be stored increases. The relationship between length and stored energy is approximately linear e.g., a tube that is twice the length will generally store twice the energy. For maximum energy storage it is desirable to have as much axial envelope or length as possible. However, as the tube length increases the likelihood for buckling increases. Thus, for applications with unlimited axial envelope (i.e. no space limitations), torsional buckling will limit the axial length, otherwise, the available envelope or space will generally limit the length. For purposes of this disclosure inner tube 12 and outer tube 14 will be considered "elongated tubes" regardless of the diameter and length (since the length will generally be greater than the diameter).

There are also manufacturing limitations affecting the selection of materials for inner tube 12 and outer tube 14. All composite materials have a minimum diameter within which they can be wound. Metals have their own limitations based on manufacturability. For example, welded metal tubes do not react to torque very well and machined metal rods are limited by heat treating properties and complex deep bore machining processes.

While metal materials may be used for both inner tube 12 and outer tube 14, metals are generally stiffer than fiber reinforced composites which reduces the energy storage capability. Titanium is one exception within the category of metals. A titanium tube would perform similarly to a composite tube but would be very expensive. On the other hand, fiber reinforced composite materials can be used for both inner tube 12 and outer tube 14. An all-composite construction may be an option for applications where metals cannot be used (for example in MRI systems or in silicon wafer systems).

Other materials may also be used in the fiber-reinforced composite tube. Glass is a good material because it is cheap and easy to manufacture and has low stiffness. Low stiffness is attractive for use in torsion bar 10 because the energy stored within the tubes is characterized by the torque multiplied by the deflection. Low stiffness materials yield higher deflection thus increasing the energy storage within torsion bar 10. The low stiffness factor introduces a new challenge to the composite manufacturing industry due to the fact that the focus has always been on increasing the stiffness. Carbon-fiber dominates most fiber-reinforced composite applications but is not the material of choice for torsion bar 10 due to the higher stiffness. There are other materials that seem attractive for use in torsion bar 10. For example, Kevlar would be an excellent fiber material but would be cost prohibitive for most applications. Selection of the proper fiber and matrix material will ultimately depend on the requirements of each individual application.

In accordance with a preferred embodiment, it has been determined that the most cost effective design with substantially superior performance (compared to conventional springs) is comprised of a steel outer tube 14 with a fiberglass reinforced composite inner tube 12. As an example in this preferred embodiment, the composite includes glass fibers with a high strain epoxy matrix material. In a specific example using the preferred materials described above and an outside diameter for outer tube 14 of approximately 1.100 inches, torsion bar 10 is able to withstand a torque of 4370 in*lbs with an angular deflection of 59 degrees. The result is approximately 187 ft*lbs of energy absorption. With an efficiency of 80% the torsion bar of this example has an energy output of approximately 150 ft*lbs. This vastly outperforms any conventional mechanical spring. The torque and deflection results stated result from the energy storage capabilities of inner tube 12 and outer tube 14 only.

Another property inherent to torsion bar 10 is the fact that the torque within inner tube 12 and outer tube 14 is equal. Therefore, inner tube 12 and outer tube 14 should be designed to handle the same torque. If one tube is significantly stronger than the other tube then torsion bar 10 will not be optimized. The stronger bar will have unnecessary mass and stiffness both of which reduce the performance. As an example, for the steel-composite torsion bar described above outer tube 14 made of high strength steel has an outer diameter of 1.100 inches and an inner diameter of 1.050 and inner tube 12 has an outer diameter of 0.990 inches and an inner diameter of 0.750 inches. It will be understood that the examples given are only for explanation and each torsion bar will take on slightly different dimensions for each individual application.

Joiner bushing 20 is used to join inner tube 12 and outer tube 14 at distal end 16. As torsion bar 10 is loaded in torsion, joiner bushing 20 transmits torque between inner tube 12 and outer tube 14. In a preferred embodiment, joiner bushing 20 is bonded to inner tube 12 and outer tube 14 using a high strength epoxy or the like. It should be understood that the joiner bushing material is important to the function of the system. The most important material property used in a selection of the joiner bushing material is the elastic modulus or, more specifically, the torsional modulus since joiner bushing 20 is loaded in torsion. Since joiner bushing 20 is bonded to materials that are deformed under load, it is important that the torsional modulus of joiner bushing 20 is similar to the materials to which it is bonded. If the torsional moduli of the materials which are bonded together are not similar the epoxy in the bondline between the two parts will be placed in high shear and the bondline will fail.

For the example of a torsion bar described above (with a metal outer tube and composite inner tube) it is highly desirable to select a material with a torsional modulus between that of inner tube 12 and outer tube 14. Generally, composite material has a minimum torsional modulus of 1.5 Msi and metal has a maximum torsional modulus of 15 Msi. Thus, preferably the material of joiner bushing 20 should lie in a range of approximately 1.5 Msi to approximately 15 Msi. In the example used, some materials that meet the requirement include (while there are undoubtedly others) aluminum, titanium, and various high modulus reinforced engineering plastics (like fiber reinforced PEEK, glass filled PET, or various filled aromatic polyimides). Other factors may also be used to select the best materials for joiner bushing 20 depending upon the requirements of specific applications (mostly cost and environmental requirements). It will be clear to the artisan that joiner bushing 20 greatly simplifies production of tubular torsion bar 10.

Figure 2:
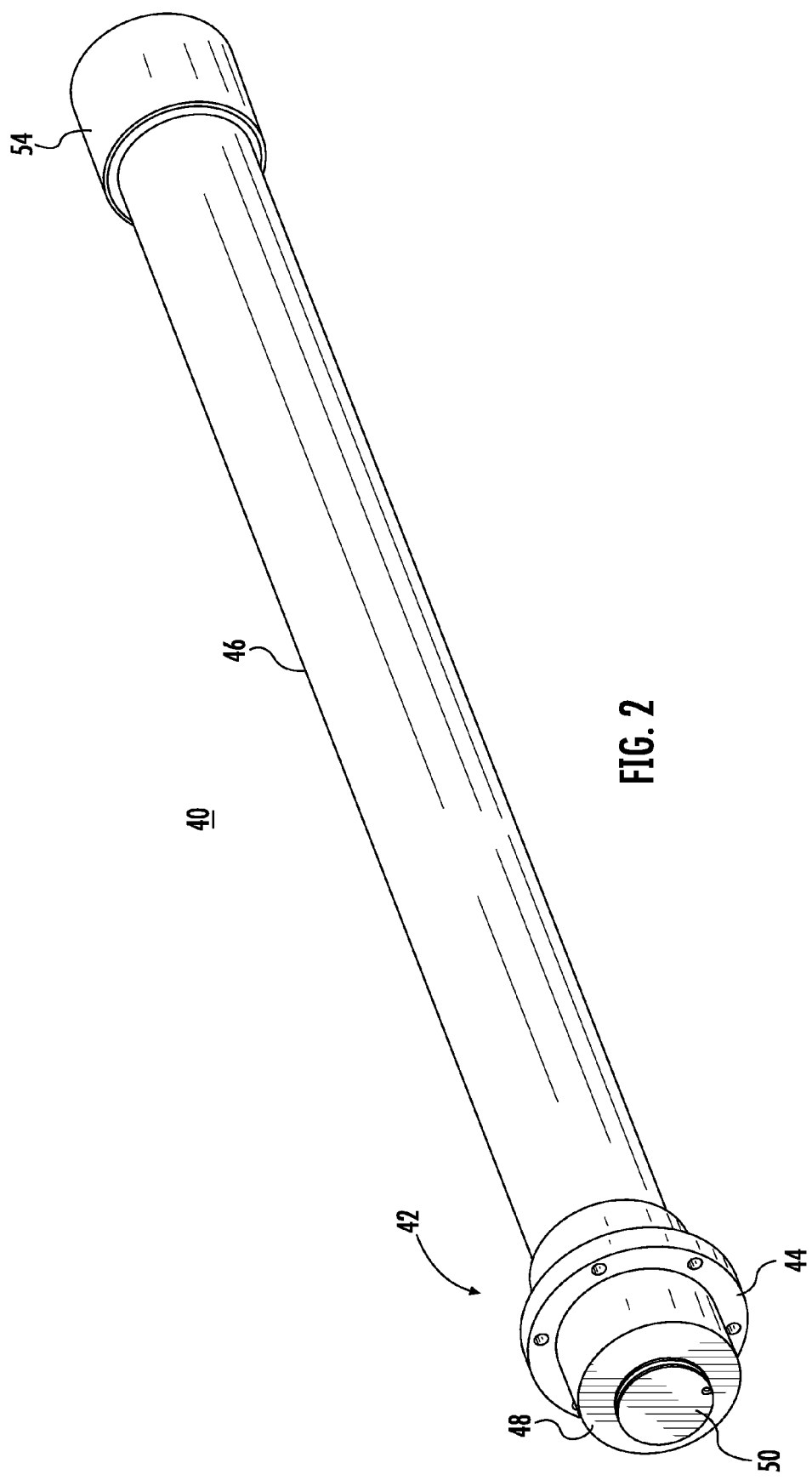
FIG. 2 is a perspective view of a tubular torsion bar in accordance with the present invention, and including an improved mounting and output system.
Figure 3:
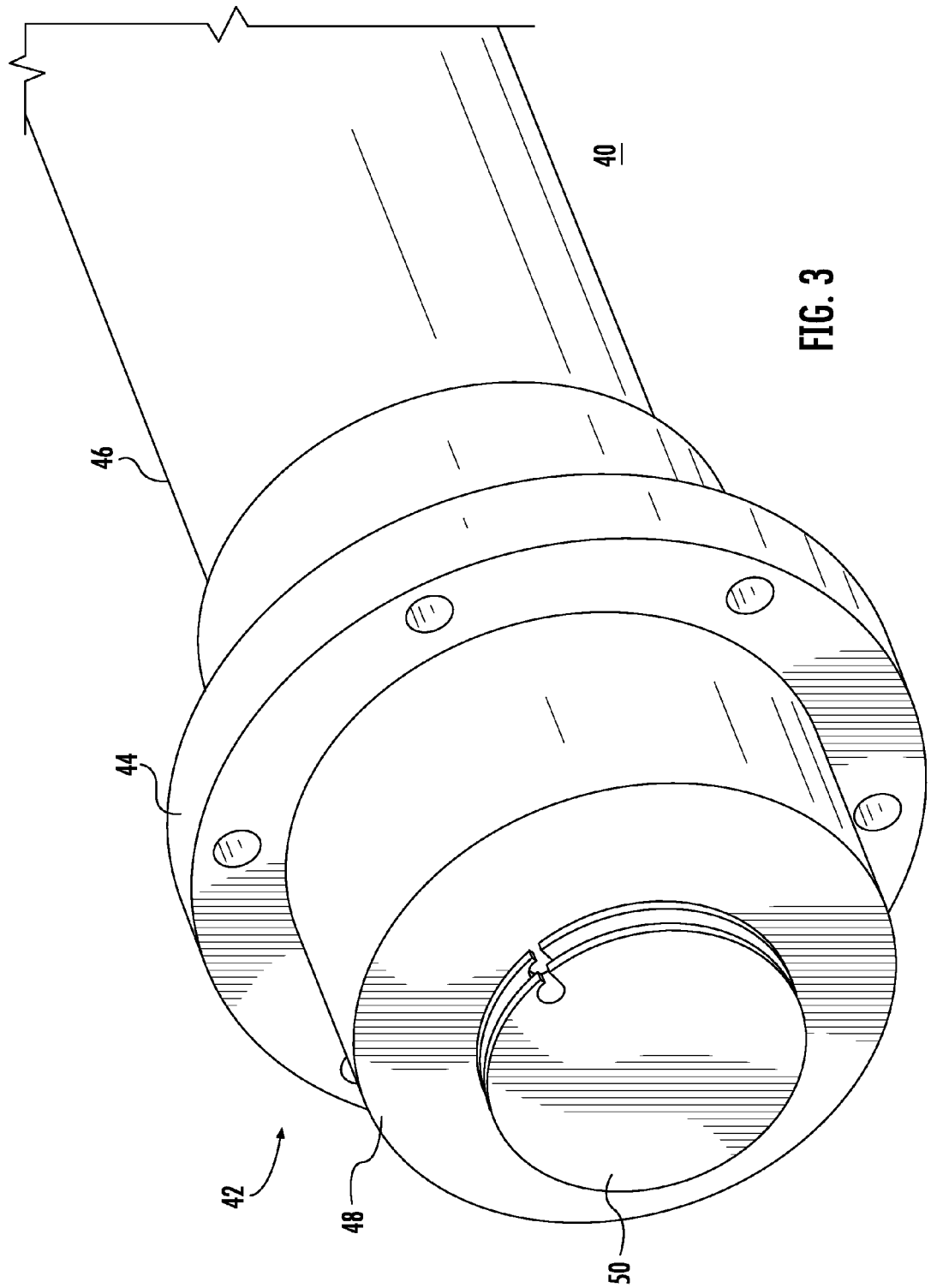
FIG. 3 is an enlarged perspective view of the improved mounting and output system.

Turning now to FIG. 2, a tubular torsion bar 40 is illustrated that includes an improved mounting and output/input (hereinafter output") system generally designated 42. System 42 includes a mounting ferrule 44 shown as a ring extending around and fixedly attached to the outer periphery of outer tube 46. It will of course be understood that mounting ferrule 44 can be formed in virtually any configuration that can be used to fixedly attach outer tube 46 to a device (not shown) requiring some spring action. A housing 48, in this preferred embodiment is formed as a part of mounting ferrule 44 and carries a planetary system described below in more detail. An output apparatus or interface 50 is coupled to the inner tube of torsion bar 40 through the planetary system for rotary movement with the inner tube. Output interface 50 is illustrated as a pulley but can be any component that can be used to couple rotary movement and output energy from/to a component of the device (not shown) requiring some spring action, such as a gear, spline, keyed shaft drive screw, sprocket, or the like.

Figure 4:
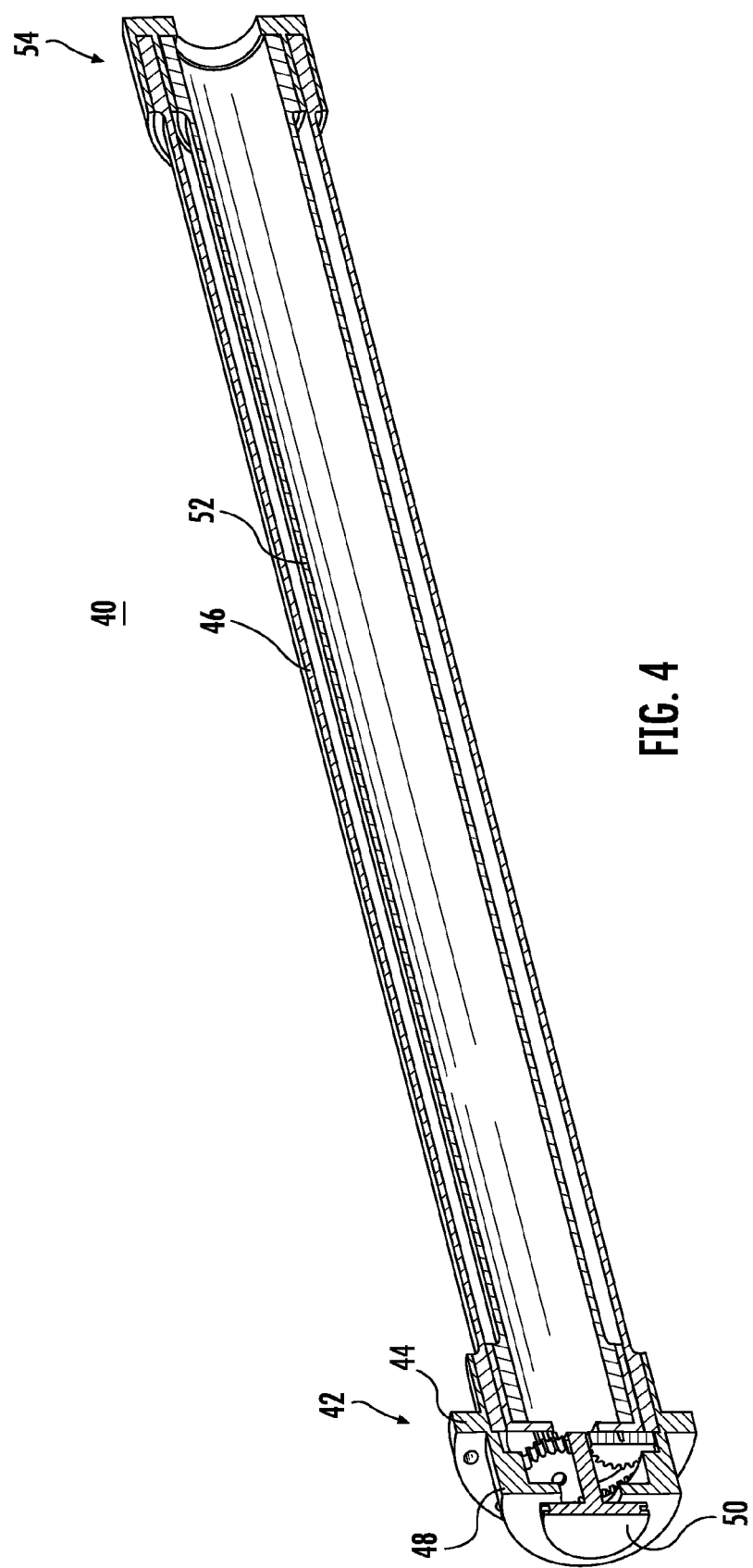
FIG. 4 is a cross-sectional view in perspective of the tubular torsion bar and improved mounting and output system of FIG. 2.
Figure 5:
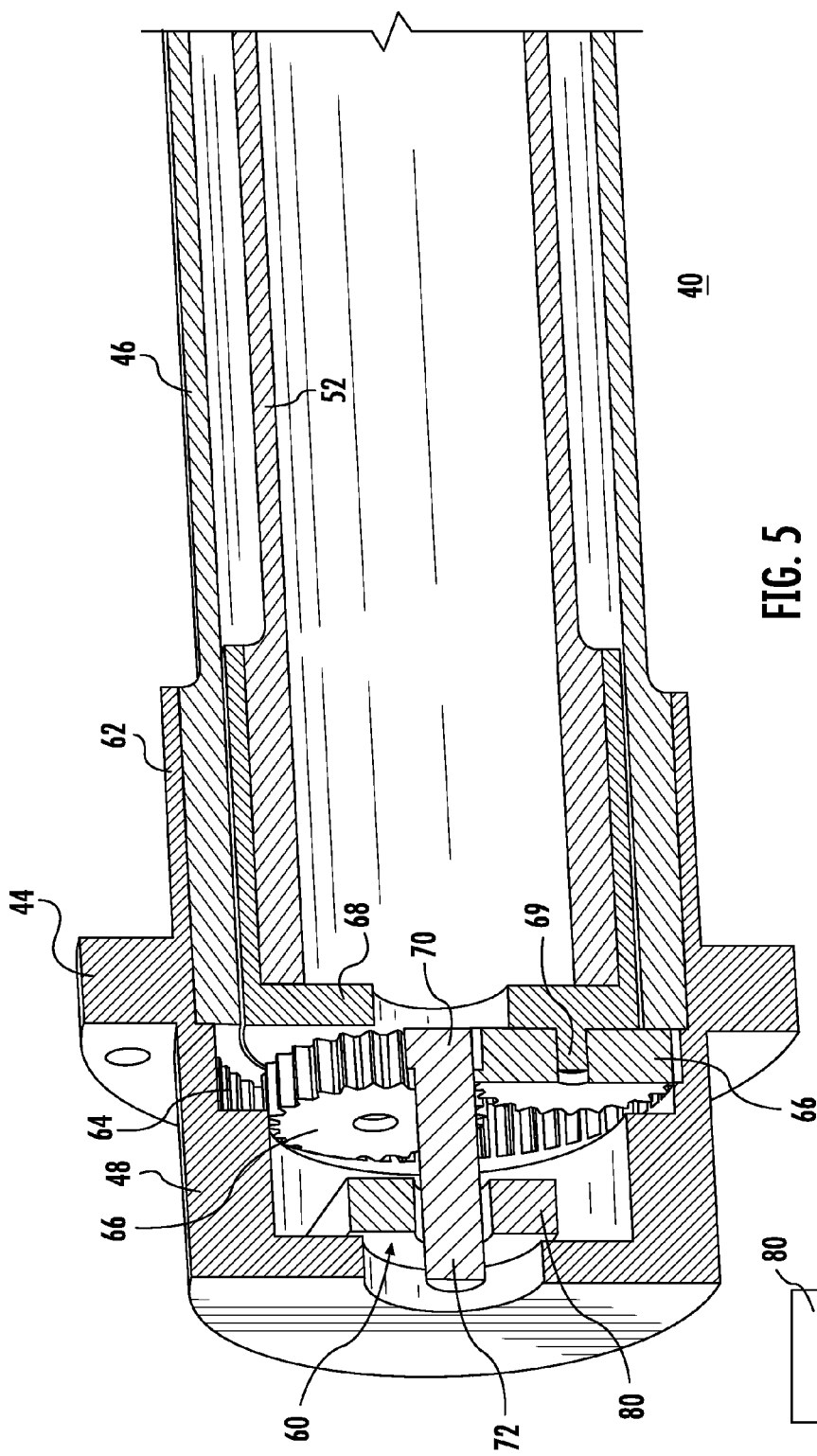
FIG. 5 is an enlarged cross-sectional view in perspective of a portion of the tubular torsion bar and the improved mounting and output system of FIG. 2.
Figure 7:
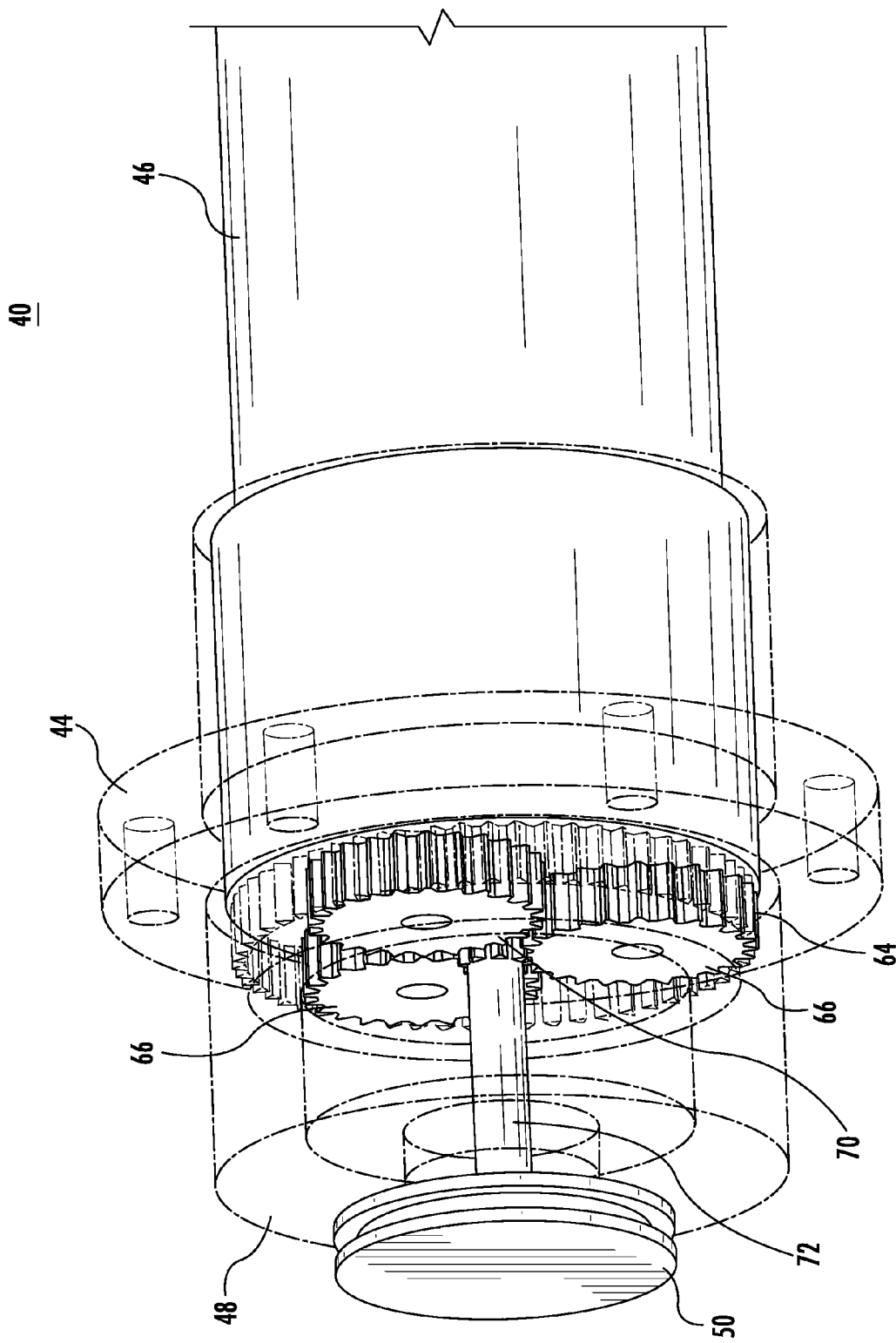
FIG. 7 is a view similar to FIG. 3 illustrating in phantom the position of various components of the improved mounting and output system.

Referring to FIG. 4, a sectional view of torsion bar 40 is illustrated showing outer tube 46, an inner tube 52, the inner components of mounting and output system 42, and a joiner bushing 54. In this example outer tube 46, inner tube 52, and joiner bushing 54 are formed as described above, i.e. a steel outer tube 46 with a fiberglass reinforced composite inner tube 52 and joiner bushing 54 lying in a range of approximately 1.5 Msi to approximately 15 Msi. With additional reference to FIGS. 5 and 7, a planetary gear system 60 can be seen positioned within housing 48. Housing 48 has a tubularly extending annulus or flange 62 that coaxially receives outer tube 46 therein and in fixed engagement therewith. In this example flange 62 is fixedly attached to outer tube 46 by a high-strength epoxy but other materials or methods may be used. A planetary ring gear 64 is formed or fixedly mounted in the inner periphery of housing 48 so as to be positioned coaxial with tubes 46 and 52. Ring gear 64 may be formed directly into the inner periphery of housing 48 or may be a separate component fixedly mounted to the inner periphery so that housing 48 and fixedly attached outer tube 46 rotate with ring gear 64. In this embodiment the proximate end of inner tube 52 is solid or closed to form a radially extending partial wall 68. Three planet gears 66 are rotatably mounted on the proximate end of wall 68 by axles 69 (one each). Planet gears 66 are mounted so as to mesh with ring gear 64 and for rotary movement about axles 69 as ring gear 64 is rotated. A sun gear 70 is mounted along the longitudinal axis of inner tube 52 and is positioned between planet gears 66 so as to mesh with each of the three planet gears 66 and rotate in response to rotation of planet gears 66 or conversely to rotate planet gears 66 in response to rotation of sun gear 70. Sun gear 70 is mounted on or adjacent to one end of an output shaft 72 which extends outwardly through an opening in the proximate end of housing 48. In this example output interface 50 (a pulley) is attached to the outwardly extending end of output shaft 72 for rotation therewith.

Figure 6:
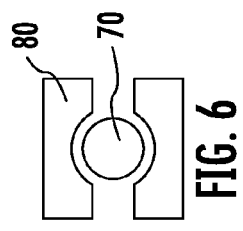
FIG. 6 is a simplified end view of a portion of the output system of FIG. 5.

Referring additionally to FIG. 6, a bearing 80 is mounted within housing 48 to guide and stabilize output shaft 72. Bearing 80 can be any of a large variety of bearings and bearing materials that mount shaft 72 and, thus, sun gear 70 for easy unhampered rotation.

One setback to torsion bar 10 described above is that the output is limited to 59 degrees of deflection. That is where planetary gear system 60 comes into play. The concentric nesting of tubes 46 and 52 and the torsional deflection is an optimal configuration for a planetary gear system to be used. Planetary gear system 60 is used to alter the torque versus deflection characteristics of torsion bar 40. With ring gear 64 fixedly attached to housing 48 and thus to outer tube 46 and planet gears 66 attached to inner tube 52 a combination of gears can be selected to achieve many different gear ratios within planetary gear system 60. As an example, in the configuration illustrated ring gear 64 has 58 teeth, the three planet gears 66 have 25 teeth each and sun gear 70 has 8 teeth resulting in a gear ratio of 8.25:1. By incorporating planetary gear system 60 with tubes 46 and 52 the maximum torque is now approximately 530 in*lbs with an angular deflection of approximately 487 degrees. It will be understood that the specific planetary gear properties mentioned are only shown and described as an example and many different gear combinations can be used to customize the torque versus deflection characteristics for each individual application. For extremely high gear ratios a multiple stage planetary system could be utilized.

In summary, the tubular torsion bar is a spring energy storage system including two concentric tubes and a joiner bushing. A planetary gear system is included to alter the torque versus deflection characteristics of the tubular torsion bar. Design details like the "torque balance" between the inner and outer tubes and proper selection of the joiner bushing material are contributing factors in the operation and efficiency of any selected embodiment. There are also many details on material selection that will yield different results based on cost and performance requirements of different applications. The planetary gear system can be manipulated to customize the required deflection for any specific application. Thus, it can be seen that the tubular torsion bar is a highly specialized device engineered to maximize energy storage potential per unit mass and volume.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A tubular torsion bar comprising:
   an elongated inner tube of flexible material having a proximal end and a distal end;
   an elongated outer tube of flexible material having a proximal end and a distal end;
   a joiner bushing fixedly attached to the distal end of the inner tube and to the distal end of the outer tube with the inner tube and outer tube positioned in coaxial and substantially coextensive concentric nesting positions and unengaged with one another substantially along their entire remaining length;
mounting apparatus fixedly attached to the proximal end of the outer tube; and
output apparatus fixedly attached to the proximal end of the inner tube.

2. A tubular torsion bar as claimed in claim 1 wherein the inner tube is formed of material having a first torsional modulus and the outer tube is formed of material having a second torsional modulus, and the first torsional modulus and the second torsional modulus are one of substantially the same and the second torsional modulus being greater than the first torsional modulus.

3. A tubular torsion bar as claimed in claim 2 wherein the first torsional modulus is equal to or greater than approximately 1.5 Msi and the second torsional modulus is equal to or less than approximately 15 Msi.

4. A tubular torsion bar as claimed in claim 2 wherein the joiner bushing is formed of material having a torsional modulus in a range extending from approximately the first torsional modulus to approximately the second torsional modulus.

5. A tubular torsion bar as claimed in claim 1 wherein both the inner tube and the outer tube are formed of composite material.

6. A tubular torsion bar as claimed in claim 1 wherein both the inner tube and the outer tube are formed of metal.

7. A tubular torsion bar as claimed in claim 1 wherein the inner tube is formed of fiberglass reinforced composite material and the outer tube is formed of steel.

8. A tubular torsion bar as claimed in claim 1 wherein the joiner bushing is fixedly attached to the inner tube and the outer tube by a high strength epoxy.

9. A tubular torsion bar as claimed in claim 1 wherein at least one of the inner tube and the outer tube are formed of composite material and the diameter of the at least one is limited by a torsional buckling load.

10. A tubular torsion bar comprising:
an elongated inner tube of flexible material having a proximal end and a distal end;
an elongated outer tube of flexible material having a proximal end and a distal end;
a joiner bushing fixedly attached to the distal end of the inner tube and to the distal end of the outer tube with the inner tube and outer tube positioned in coaxial and substantially coextensive concentric nesting positions and unengaged with one another substantially along their entire remaining length;
mounting apparatus fixedly attached to the proximal end of the outer tube; and
a planetary gear system including a ring gear fixedly connected to the proximal end of the outer tube and planet gears in meshing engagement with the ring gear and attached to the proximal end of the inner tube, the planetary gear system attached to apply a torque to the outer tube relative to the inner tube, and the planetary gear system including a sun gear in meshing engagement with the planet gears and connected to an output shaft.

11. A tubular torsion bar as claimed in claim 10 wherein the inner tube is formed of material having a first torsional modulus and the outer tube is formed of material having a second torsional modulus, and the first torsional modulus and the second torsional modulus are one of substantially the same and the second torsional modulus being greater than the first torsional modulus.

12. A tubular torsion bar as claimed in claim 11 wherein the first torsional modulus is equal to or greater than approximately 1.5 Msi and the second torsional modulus is equal to or less than approximately 15 Msi.

13. A tubular torsion bar as claimed in claim 11 wherein the joiner bushing is formed of material having a torsional modulus in a range extending from approximately the first torsional modulus to approximately the second torsional modulus.

14. A tubular torsion bar as claimed in claim 10 wherein both the inner tube and the outer tube are formed of composite material.

15. A tubular torsion bar as claimed in claim 10 wherein both the inner tube and the outer tube are formed of metal.

16. A tubular torsion bar as claimed in claim 10 wherein the inner tube is formed of fiberglass reinforced composite material and the outer tube is formed of steel.

17. A tubular torsion bar as claimed in claim 10 wherein the joiner bushing is fixedly attached to the inner tube and the outer tube by a high strength epoxy.

18. A tubular torsion bar as claimed in claim 10 wherein at least one of the inner tube and the outer tube are formed of composite material and the diameter of the at least one is limited by a torsional buckling load.

19. A tubular torsion bar as claimed in claim 10 wherein the planetary gear system is designed to provide a selected torque versus deflection characteristic of the tubular torsion bar.

20. A tubular torsion bar comprising:
an elongated inner tube of flexible material having a proximal end and a distal end;
an elongated outer tube of flexible material having a proximal end and a distal end;
a joiner bushing fixedly attached to the distal end of the inner tube and to the distal end of the outer tube with the inner tube and outer tube positioned in coaxial and substantially coextensive concentric nesting positions and unengaged with one another substantially along their entire remaining length;
a housing fixedly attached to the proximal end of the outer tube;
a planetary gear system positioned within the housing and including a ring gear fixedly connected to an inner surface of the housing and coaxial with the outer tube, planet gears in meshing engagement with the ring gear and attached to the proximal end of the inner tube, and a sun gear positioned coaxial with the inner tube and in a meshing relationship with the planet gears;
an output shaft affixed to and coaxial with the sun gear, the output shaft mounted to extend outwardly from the housing and accessible externally from the housing; and
the planetary gear system attached to apply a torque to the outer tube relative to the inner tube, and the planetary gear system designed to provide a selected torque versus deflection characteristic of the tubular torsion bar.

21. A tubular torsion bar as claimed in claim 20 wherein the inner tube is formed of fiberglass reinforced composite material with a first torsional modulus and the outer tube is formed of steel with a second torsional modulus, the first torsional modulus being less than the second torsional modulus.

22. A tubular torsion bar as claimed in claim 21 wherein the joiner bushing is formed of material having a torsional modulus in a range extending from approximately the first torsional modulus to approximately the second torsional modulus.

* * * * *